O. MESWARB.
LIQUID WEIGHING APPARATUS.
APPLICATION FILED AUG. 3, 1908.
919,050.
Patented Apr. 20, 1909.
3 SHEETS—SHEET 3.
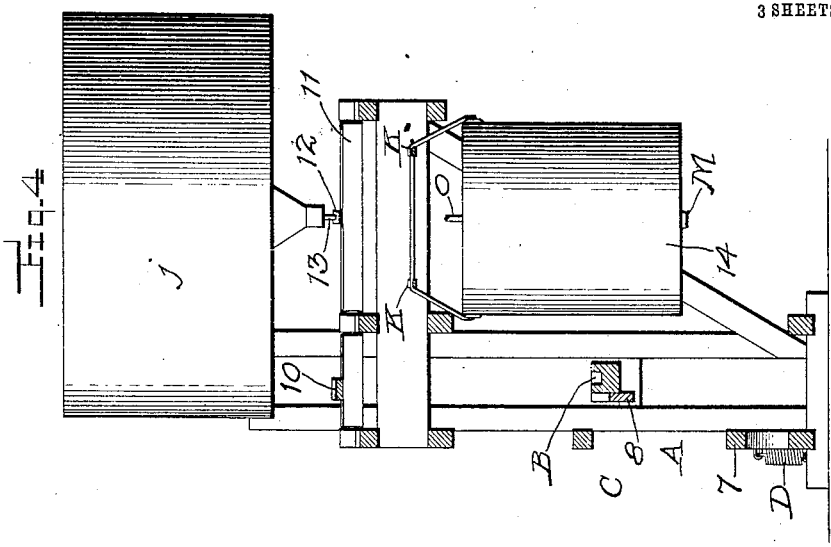
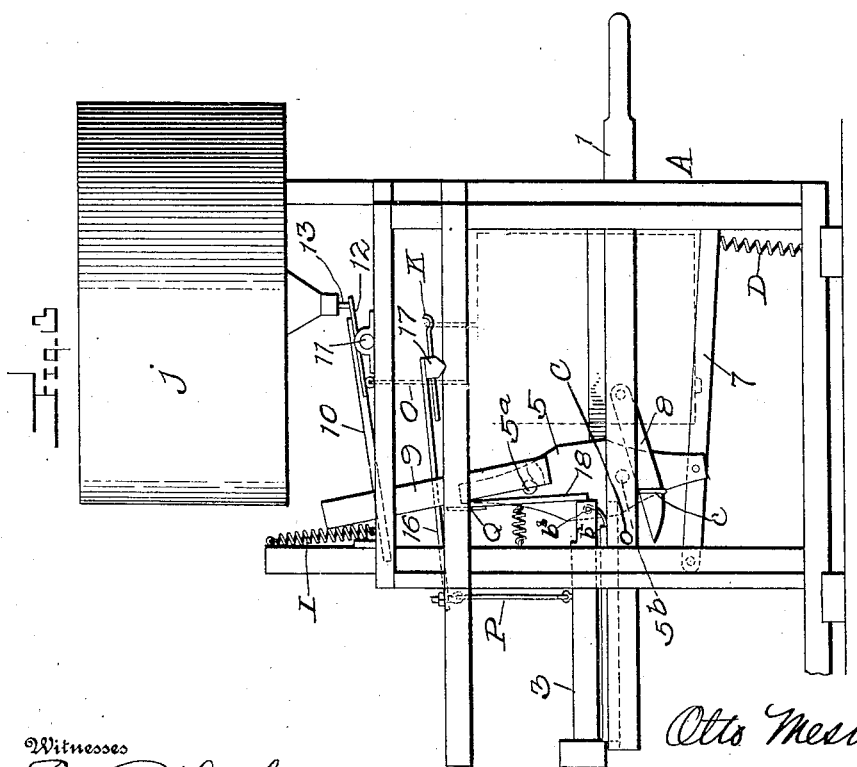

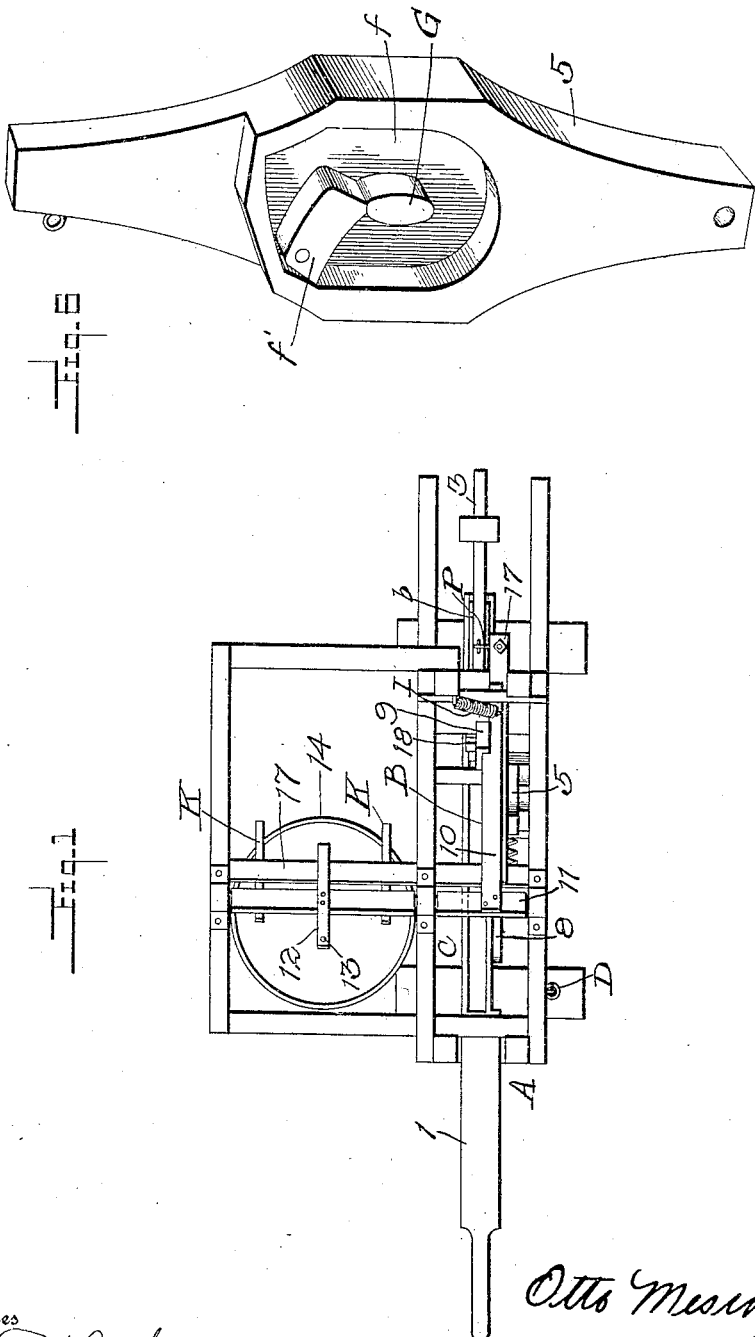

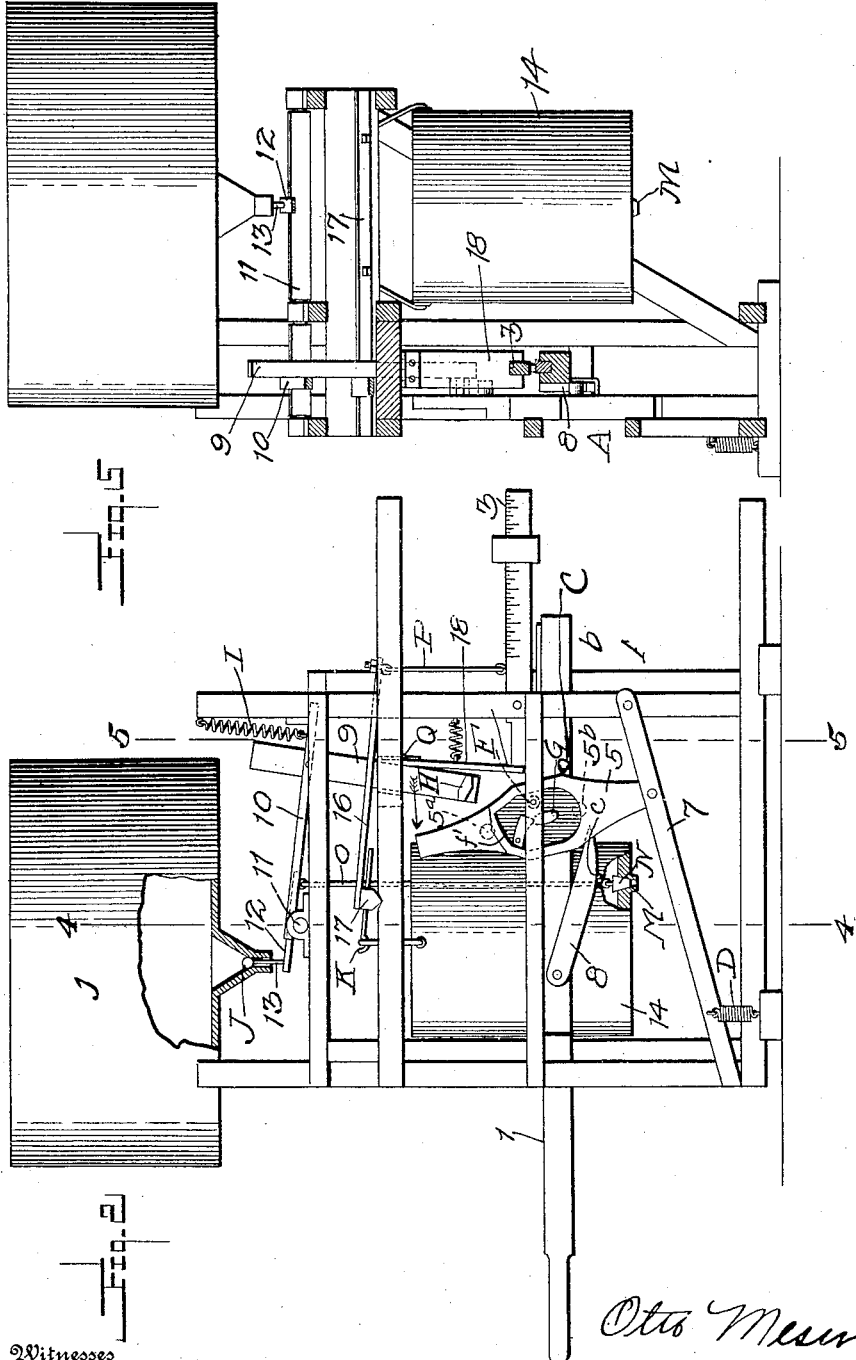

UNITED STATES PATENT OFFICE.

OTTO MESWARB, OF SUMNER, IOWA.

LIQUID-WEIGHING APPARATUS.

No. 919,050.  Specification of Letters Patent.  Patented April 20, 1909.

Application filed August 3, 1908. Serial No. 446,704.

*To all whom it may concern:*

Be it known that I, OTTO MESWARB, a citizen of the United States of America, residing at Sumner, in the county of Bremer and State of Iowa, have invented certain new and useful Improvements in Liquid-Weighing Apparatus, of which the following is a specification.

This invention relates to weighing apparatus and particularly to means for weighing milk or other liquids.

While this invention is designed primarily for weighing skimmed milk and for discharging it from the receptacle from which it is weighed, it is to be understood that any other liquid may be weighed or measured by this apparatus and I, therefore, do not wish to be limited with respect to the use of said apparatus.

An object of this invention is to provide novel means for adjusting the weight on the scale beam and for simultaneously operating the parts of the mechanism for the purpose of opening the valve of the container or tank for the purpose of permitting the liquid to flow therefrom into a suitable receptacle designed for the purpose of receiving the material to be weighed.

A further object of the invention is to provide novel means for automatically cutting off the supply from the tank or container through the valve controlling means, means being also provided for simultaneously controlling the valve in the receptacle in order that the said valve may permit the escape of the liquid contained in the receptacle, the relation of the valve of the tank or container and the valve of the receptacle being such that they alternately open and close under the influence of manually operated parts and spring actuated elements to be hereinafter more fully set forth and claimed.

In describing the invention in detail, reference will be had to the accompanying drawings forming part of this specification wherein like characters denote corresponding parts in the several views, in which—

Figure 1, is a top plan view of an apparatus embodying the invention; Fig. 2, illustrates a side elevation thereof with the tank partly in section; Fig. 3, illustrates an elevation of the apparatus taken from the side opposite to that shown in Fig. 2; Fig. 4, is a transverse sectional view thereof; Fig. 5, is a transverse sectional view thereof; and Fig. 6, is a perspective view of an arm.

In these drawings, A, denotes a frame having an operating bar 1, slidable therein, said bar having a slot B, in its upper surface designed to receive a check $b$, which is adapted to adjust the weight to weigh the number of pounds corresponding to the value of the check. That is to say, if the check represents the value of one hundred pounds of milk, liquid, or the like, the weight will be moved on the scale beam 3, to the hundred pound mark or if the check represents other values, the weights will be such as to move the weight on the scale beam the required degree. The operating bar is also provided with a cross pin C, and a dog 8 supported by the link $c$; said dog being pivotally connected to the operating bar. The function of the dog is to engage the stud $5^b$, which projects from the arm 5, for the purpose of causing the stud to ride up the inclined surface of the dog to elevate the arm 5.

A lever 7, is pivoted to the frame and it has a spring D, for normally drawing its outer end toward the base of the frame. The arm 5, is pivoted to the lever 7, and said arm is engaged by the pin C, to move the said arm in the direction of the arrow, that is to draw the lug $5^a$, from engagement with the shoulder H (which relation of parts will be presently explained).

The frame has a pin preferably supporting an anti-friction roller F, which projects into an annular recess $f$, of the arm 5 and said recess is provided with a dog $f'$, pivoted to the arm and having its end resting on the lug G, in the center of the recess. When the arm is elevated by the dog 8, the roller F, causes the arm to rise substantially vertically until the lug $5^a$, is elevated above a shoulder H, on the reciprocating arm 9, and the anti-friction roller F, contacting with the side wall of the recess $f$, acts as a cam to move the arm 5, on its pivot to cause the lug $5^a$, to overlie the shoulder H. At the time the lug is above the shoulder, the weight has been moved to the proper position on the scale beam by the check on the operating bar and at this time the inner end of the dog 8, has passed the stud $5^b$, and the stud drops back of the dog. The arm 5, under the action of the spring operated lever 7, is caused to descend and draw with it the arm 9. In this embodiment of the invention, the spring of the lever 7, is sufficiently strong to overcome the pull of the spring I, and therefore the lever 7, through the action of the arm 5, draws the said arm downwardly.

The arm 9, is connected to a lever 10, secured to a rock bar 11, on which the arm 12, is secured, hence as the arm 9, is reciprocated, the rock bar 11, is moved and the arm 12, is oscillated. The arm 12, contains a valve displacing member 13, adapted to engage and unseat the valve J, in the vat j, said vat being designed to contain skimmed milk although I do not wish to be limited with respect to the material measured or weighed. Upward movement of the valve displacing member results in opening the valve and said valve is closed by gravity when the valve displacing member descends.

The bar 17, has a knife edge which is mounted to rock in bearings of the frame. The bar 17, has arms K, to support a receptacle 14, having an open top to receive liquid from the vat and a discharge opening M, provided with a valve N. The valve N is connected by a chain O, or other flexible device to the arm 12, at the end opposite that containing the valve displacing member and the relation of the parts is such that the valve N, is seated to close the opening M, when the valve of the tank is open and vice versa.

The lever 16, is connected by a link P, to the scale beam 3, and when the receptacle 14, contains matter of the required weight, the outer end of the lever is elevated and the said scale beam is raised. The inner end of the scale beam controls a guard 18, which is hinged to the frame at Q, and said guard has a spring which pulls its ends normally toward the arm 9. The guard is designed to retain the lug 5ª, on the shoulder H, until the proper quantity of liquid has been delivered to the receptacle 14, and in the normal position of the scale beam, when the weight has been adjusted, the inner end is elevated to engage the guard 18, and said guard cannot swing on its hinge until the proper quantity of liquid has been delivered to the receptacle, and the outer end of the scale beam is elevated, as it is the movement just described that causes the inner end of the scale beam to descend below the end of the guard. The strength of the lever 7, is sufficient to cause the lug 5ª, to displace the guard and pull said lug from the shoulder H, thus releasing the arm 9, and permit it to be drawn up by the spring I. The upward movement of the arm 9, results in a movement of the valve displacing member away from the valve and said valve is permitted to regain its seat and close the discharge opening of the vat.

As the lever 7, draws the arm 5, down, the pin C, draws the upper end of the lever in the direction opposite the arrow and the lug 5ª, will travel clear of the end of the arm 9, when the arm 5, is again elevated through the manipulation of the bar 1, as heretofore described. When the upper end of the arm 5, is moved by the pin C, the dog $f'$, passes over the roller F, and drops into place to guard the recess and prevent the arm from swinging back until said arm is elevated so that the lower end of the annular recess is in alinement with the roller in which position the lug 5ª, is above the plane of the shoulder H, and the camming action of the roller and side wall of the recess in the arm 5, will swing said arm on its pivot and again carry the lug 5ª, to a position overlying the shoulder H.

In order to remove the check B, from the rod 1, when the said rod is returned for a repetition of the operation, the said check is provided with a shoulder $b^2$, which is engaged by a dog $b^3$, secured to the under surface of the scale beam 3, the end of the dog projecting outwardly and being of such material as to permit the check to pass thereunder until the shoulder passes the end of the dog when said dog will spring or fall by gravity and engage the shoulder, when the rod 1, is returned for a repetition of the operation. As the dog $b^3$, will hold the check against returning with the rod, the said check will be removed from the rod and will fall by gravity.

I claim—

1. In a liquid weighing apparatus, a tank having a valve discharge opening, a weighing receptacle thereunder having a discharge opening, means for alternately opening and closing the valves of the tank and receptacle, a scale beam, means for communicating motion of the weighing receptacle to the scale beam, an operating rod, a weight on the scale beam, means carried by the operating rod for setting the weight to weigh a predetermined amount, a valve operating mechanism, means operating in conjunction with the scale beam for holding the valve operating mechanism against movement until the scale beam is tilted, and means elevated by the movement of the operating rod for engaging the valve operating mechanism to operate said valve operating mechanism when the scale beam is tilted.

2. In a liquid weighing apparatus, a tank, a weighing receptacle into which the tank discharges, a valve in the tank and a valve in the weighing receptacle, means for alternately opening and closing the valves, a device connected to the valve operating mechanism held normally elevated, an operating rod, a scale beam, a weight thereon, means carried by the operating rod for setting the weight at the proper positions on the scale beam, means elevated by the action of the operating rod and moved to engage the device for controlling the valve operating mechanism, and a guard for retaining said means in engagement with the device for operating the valve mechanism, said guard being released by the tilting action of the scale beam.

3. In a liquid weighing apparatus, a tank, a valve therein, a receptacle, a valve in the receptacle, means for alternately opening and closing the valves of the tank and receptacle, a bar for actuating the valves, said bar having a shoulder thereon, a guard on the bar, a scale beam holding the guard in operative relation to the bar when the inner end of the scale beam is elevated, an arm having a stud adapted to be elevated into engagement with the shoulder of the bar, means whereby the arm moves the bar longitudinally, and means whereby the stud of the arm is disengaged from the stud of the bar.

4. In a weighing apparatus, an operating bar, a check thereon, a spring held lever, a pivoted arm thereon, a stud on the arm engaged by the dog to elevate the arm, means on the operating bar to swing the arm on its pivot when the said arm is raised a predetermined distance, a bar held normally elevated by a shoulder, a stud on the arm adapted to engage the upper surface of the shoulder, a guard for retaining the stud on the shoulder, a scale beam having its end engaging the guard to hold the stud on the shoulder, said guard being released by tilting of the scale beam, a tank and receptacle, means for mounting the receptacle to communicate motion to the scale beam, valves in the tank and receptacle, and means whereby the movement of the bar controls the valves.

5. In a weighing apparatus, an operating bar, a dog thereon, a spring held lever, a pivoted arm thereon, means for actuating the pivoted arm, a stud on the arm engaged by the dog of the operating bar to elevate the arm, means for swinging the bar on its pivot, the relation of the dog on the bar and the means for operating the arm being such that the said bar is moved a predetermined degree before the arm is swung on its pivot, a bar having a shoulder, a stud on the arm adapted to engage the upper surface of the shoulder when the said arm is elevated, a guard for retaining the stud on the shoulder, a scale beam for controlling the position of the guard with relation to the arm, a tank, a receptacle, means for communicating motion of the receptacle to the scale beam, valves in the tank and receptacle, means operated by the bar for controlling the valves, and means for holding the bar normally elevated.

6. In a weighing apparatus, an operating bar, an arm, a lever to which the arm is pivoted, said arm having a recess, a stud projecting into the recess, means for guiding the arm with relation to the stud, a dog on the operating bar adapted to raise the arm, means on the operating bar for swinging the arm on its pivot, a bar having a shoulder, means on the arm for engaging the shoulder, a guard for retaining the arm and bar in operative relation, a scale beam for controlling the guard, a receptacle mounted to communicate motion to the scale beam, a tank discharging into the receptacle, valves for the tank and receptacle, means for holding the bar normally elevated, and means whereby the movement of the bar controls the valves of the tank and receptacle.

In testimony whereof, I affix my signature in the presence of two witnesses.

OTTO MESWARB.

Witnesses:
H. J. KOCH,
W. H. BABCOCK.